United States Patent [19]

Shomer

[11] Patent Number: 5,958,593
[45] Date of Patent: Sep. 28, 1999

[54] HARDENER FOR EPOXY RESINS

[76] Inventor: John Shomer, 19 Hareuth St., Hod-Hasharon, Israel

[21] Appl. No.: 08/877,337

[22] Filed: Jun. 17, 1997

Related U.S. Application Data

[63] Continuation of application No. 08/439,966, May 12, 1995, abandoned.

[30] Foreign Application Priority Data

May 23, 1994 [IL] Israel .......................................... 110354

[51] Int. Cl.$^6$ ...................................................... B32B 27/38
[52] U.S. Cl. .................... 428/413; 428/913; 252/182.13; 252/182.26; 252/182.25; 252/182.31; 252/182.32; 528/86; 528/87; 528/88; 528/93; 528/97

[58] Field of Search ...................................... 428/413, 913; 252/182.13, 182.26, 182.29, 182.31, 182.32; 528/86, 87, 88, 93, 95

[56] References Cited

FOREIGN PATENT DOCUMENTS 0083813  7/1983  European Pat. Off. .

*Primary Examiner*—Leszek Kiliman
*Attorney, Agent, or Firm*—Herbert Dubno

[57] ABSTRACT

A hardener for epoxy resins is disclosed the use of which imparts improved resistance in the resins to aging on exposure to ultraviolet radiation. The hardener comprises (a) at least one amine selected from the group consisting of trimethylhexamethylenediamine and isophoronediamine and (b) at least one inorganic salt which contains nitrate ion.

23 Claims, No Drawings

HARDENER FOR EPOXY RESINS

CROSS REFERENCE TO RELATED APPLICATION

This is a file-wrapper continuation of application Ser. No. 08/439,966 filed May 12, 1995 now abandoned.

FIELD OF THE INVENTION

The present invention relates to improved epoxy resins and to a novel hardener for epoxy resins.

BACKGROUND OF THE INVENTION

Aliphatic and cycloaliphatic amines such as trimethylhexamethylenediamine (e.g. the commercially available mixture of approximately equal parts of the 2,2,4- and 2,4,4-isomers), and isophoronediamine (3-aminomethyl-3,5,5-trimethylcyclohexylamine), are frequently used hardeners for epoxy resins, at the present time. A large quantity of epoxy resins reacted in this manner is utilized for protective coatings, castings and electrical applications. When exposed to ultraviolet radiation, e.g. in the form of sunlight, epoxy resins generally, including those produced as described above, show considerable yellowing, often in a matte of hours, eventually becoming brown in color, and further exhibiting loss of gloss and even a tendency to powder. Consequently, the range of applications of such resins, for outside use, is limited.

A principal cause of the undesirable characteristics of epoxy resins just mentioned may be the use of phenolic accelerators as a constituent of hardeners. Salicylic acid is a commonly used accelerator which contains a phenolic group, but other phenolic accelerators which may be mentioned in this connection are, e.g., phenol, cresols and 2,4,6-tris(dimethylamino)phenol, etc.

OBJECT OF THE INVENTION

An object of the present invention is to avoid the above-mentioned undesirable aging characteristics of epoxy resins, when exposed to ultraviolet radiation. Other objects of the invention will appear from the description which follows.

SUMMARY OF THE INVENTION

The present invention thus provides in one aspect a hardener for epoxy resins, the use of which imparts improved resistance in the resins to aging on exposure to ultraviolet radiation, which comprises (a) at least one amine selected from trimethylhexamethylenediamine and isophoronediamine, and (b) at least one inorganic salt which contains nitrate ion. The hardener of the invention also optionally contains (c) as solvent for components (a) and (b), at least one solvent medium selected from monohydric alcohols containing 1 to 10 carbon atoms in the molecule, polyhydric alcohols containing 2 to 10 carbon atoms and 2 to 4 hydroxy groups in the molecule, poly($C_{2-5}$-alkylene) glycols and $C_{1-4}$ monohydric alcohols substituted by phenyl, e.g. benzyl alcohol, and/or (d) epoxy resin in less than the stoichiometric ratio required for complete reaction with component (a). It is to be understood that the description of component (c) as a solvent is not intended to limit the amount of (c) in the hardener. As will be apparent from the description infra, component (c) may be present in the hardener in an amount as low as 0.05–0.5 wt. %, or less, based on the amount of component (a).

In another aspect, the invention provides a method for curing epoxy resins, to obtain a cured product having improved resistance to aging on exposure to ultraviolet radiation, which method is characterized by the use of a hardener as defined above.

It will be appreciated by persons skilled in the art, that since a widespread method for curing epoxy resins uses a hardener which comprises at least one amine selected from trimethylhexamethylenediamine and isophoronediamine, together with a phenolic accelerator (e.g. phenol, cresols, nonylphenol, 2,4,6-tris(dimethylaminomethyl)phenol or salicylic acid), in presence of a solvent medium, the improvement introduced by the present invention, according to a particular aspect thereof, consists of replacing at least 90% and preferably essentially 99.5–100% of the phenolic accelerator by (generally a lesser amount of) at least one dissolved inorganic salt which contains nitrate ion, and using at least one solvent medium selected from monohydric alcohols containing 1 to 10 carbon atoms in the molecule, polyhydric alcohols containing 2 to 10 carbon atoms and 2 to 4 hydroxy groups in the molecule, poly($C_{2-5}$-alkylene) glycols and $C_{1-4}$ monohydric alcohols substituted by phenyl, e.g. benzyl alcohol; and thereby obtaining cured epoxy resins having improved resistance to aging on exposure to ultraviolet radiation.

The present invention further relates to a product selected from a shaped article comprising cured epoxy resins, an article including an adhesive comprising cured epoxy resins, films comprising cured epoxy resins, and coatings comprising cured epoxy resins, the product having improved resistance to aging an exposure to ultraviolet radiation, in which the resins have been cured (e.g., in situ) by the present method.

REFERENCE TO PRIOR ART

FR 2,229,728 describes a method for hardening epoxy resins, at low temperatures, by use of a hardener selected from amines, amides and mercaptans, in the presence of an accelerator which is an alkaline salt soluble in amines or amides. This patent, which lists numerous amines and alkaline salts, does not describe any specific combination of a nitrate with the amines used in the present invention, nor does it utilize any hydroxylic solvents as is preferred according to the present invention.

EP 0,083,813 A1 describes heat-curable compositions comprising in effect, a polyepoxy compound, a curing amount of an amino compound containing at least three amino hydrogen atoms per molecule, a catalytic amount of a particular Group I or II metal salt, and a polyalkylene ether glycol. This patent is not directed to low temperature curing of epoxy resins ad does not mention the amines used in the present invention.

Moreover, neither document addresses the problem of how to impart improved resistance to aging in epoxy resins, on exposure to UV radiation.

DETAILED DESCRIPTION OF THE INVENTION

While in general the inorganic salt component useful in the present invention may be selected from any such salt containing nitrate ion, the salt is preferably selected from the nitrates of ammonium, lithium, sodium, potassium, magnesium, calcium, strontium, barium and aluminum, most preferably being selected from calcium nitrate dihydrate and calcium nitrate tetrahydrate.

Component (b) may be present, e,g., in an amount of 0.05 to 1.0 wt. %, based on the weight of component (a). It is known in the art that the reaction of isophoronediamine with epoxy resin does not progress past the B stage of cure in the absence either of an accelerator or the application of heating to elevated temperatures. However, according to an embodiment of the invention, illustratively, incorporation of at least 0.05 to 0.5 wt. %, based on isophoronediamine, of component (b), particularly calcium nitrate dehydrate or the tetrahydrate, has been found to actuate full cure when mixed with epoxy resin; component (b) may be incorporated in the hardener in an amount of e.g. 0.1 to 1.0 wt. % (based on isophoronediamine) of a 50% solution of (b) in aqueous ethanol, more preferably substantially 50% aqueous ethanol. Such a hardener composition is water clear and is shelf-stable over a long period, whereas a mixture of isophoronediamine and conventional salicylic acid accelerator becomes a pinkish-red color on storage.

In a particular embodiment, the solvent medium is preferably selected from ethanol, ethyleneglycol, propylene glycol, glycerol and benzyl alcohol. Water is an optional ingredient of the hardener of the invention, and will of course be present in any event when a nitrate containing water of crystallization is used such as the nitrates specifically mentioned.

As will be evident from the foregoing description, it is preferred that the hardener does not contain any phenolic accelerator.

In a further embodiment, the hardener comprises additionally an epoxy resin, which has the effect of increasing the viscosity of the hardener and reducing the moisture sensitivity; e.g., the total of the solvent medium, amine component and inorganic nitrate may amount to 60–90 parts by weight, admixed and reacted with 10 to 40 parts by weight epoxy resin.

Epoxy resins which may be hardened by employing the hardener of the invention (and the epoxy resins which may be used as a constituent of the hardener, e.g. to increase its viscosity) are those available generally in the art. Without implying any restriction of the scope of the invention in this regard, it may be mentioned that widely-used epoxy resins are those derivable by reaction of a phenol such as Bisphenol A with e.g. epichlorohydrin. Other epoxy resins which may be used, and which are presently preferred, are non-phenol derived epoxy resins, e.g. cycloaliphatic epoxy resins such as the bis-glycidyl ester of hexahydrophthalic acid, etc.

While use of the hardeners of the invention notably improves resistance of the product to aging under exposure to ultraviolet radiation, in the case of epoxy resins derived from phenols such as Bisphenol A, the inventor's experimental work to date shows that probably even better long-term results are obtained, as regards lack of yellowing or loss of gloss on exposure to UV radiation and weathering, when using non-phenolic epoxy resins, e.g. cycloaliphatic epoxy resins such as the bis-glycidyl ester of hexahydrophthalic acid. Thus, in a particular embodiment, phenol-derived epoxy resins are absent from the epoxy resin to be hardened and/or the hardener, it being particularly preferred that phenol-derived epoxy resins are absent from both the epoxy resin to be hardened and the hardener.

The epoxy resins which may be hardened by employing the hardener of the invention and the epoxy resins which may be used as a constituent of the hardener, may be the same as or different from each other. When they are the same, it is preferred that the epoxy resins used are not phenol-derived. Moreover, when they are the same, it is presently preferred that the epoxy resins comprise or consist essentially or entirely of the bis-glycidyl ester of hexahydrophthalic acid.

The invention will now be illustrated by the following Examples.

COMPARATIVE EXAMPLE A

A conventional coating contains 66 g epoxy resin and 34 g hardener (the hardener consisting of 100 parts by weight (pbw) isophoronediamine, 88 pbw benzyl alcohol, 12 pbw salicylic acid and 20 pbw epoxy resin—epoxy equivalent 195, 20 parts). This composition, after curing and when exposed to UV radiation, turns dark yellow within a few days and eventually turns brown and loses its surface gloss.

COMPARATIVE EXAMPLE B

In this Example, the 100 pbw isophoronediamine of comparative Example A was replaced by 55 pbw isophoronediamine and 45 pbw trimethylhexamethylenediamine (consisting of approximately equal parts of the 2,2,4- and 2,4,4-isomers), with similar results.

EXAMPLE 1

The compositions described in comparative Examples A and B, above, were modified in that the 12 pbw salicylic acid was replaced by 1, 2, 3, 4, 5 or 6 g of a formulation containing 80 pbw calcium nitrate dihydrate or tetrahydrate, 60 pbw ethanol and 20 pbw water. The cured epoxy resin showed no significant yellowing after 1000 hours exposure to ultraviolet radiation and retained its transparent and glossy appearance after 1000 hours of similar exposure. Variation in the amount of calcium nitrate used affected the speed of curing, but not the resistance of the product to aging under exposure to ultraviolet radiation.

EXAMPLE 2

Replacement of the hardener formulation of Example 1 by one containing 50 pbw isophoronediamine 49.8 pbw benzyl alcohol and 0.2 pbw calcium nitrate tetrahydrate (dissolved in ethanol), gave similar results.

EXAMPLE 3

When the hardener formulation of Example 1 was replaced by a hardener containing 45.5 pbw isophoronediamine, 45.3 pbw benzyl alcohol, 9 pbw epoxy resin (epoxy equivalent weight 145–156) and 0.2 pbw calcium nitrate dihydrate (as a 50% solution in ethanol), similar results were obtained.

EXAMPLE 4

Replacement of the hardener formulation of Example 1 by one containing 22.9 pbw isophoronediamine, 18.7 pbw trimethylhexamethylenediamine, 41.5 pbw benzyl alcohol, 16.7 pbw epoxy resin and 0.2 pbw calcium nitrate dihydrate (as a 50% solution in ethanol), gave similar results.

EXAMPLE 5

When the hardener formulation of Example 1 was replaced by a hardener containing 41.7 pbw trimethylhexamethylenediamine, 41.4 pbw benzyl alcohol, 16.6 pbw epoxy resin and 0.3 pbw calcium nitrate dihydrate (as a 50% solution in ethanol), similar results were obtained.

EXAMPLE 6

A hardener was prepared by mixing together 100 pbw isophoronediamine, 88 pbw benzyl alcohol, and 20 pbw epoxy resin (epoxy equivalent weight 186–192). The same epoxy resin (64.7 pbw) was mixed with 35.3 pbw hardener and varying amounts of calcium nitrate tetrahydrate (50% in ethanol), and the gel time of the mixture under natural light at an ambient temperature of 22° C. was observed, with the following results.

TABLE

Gel time of epoxy resin using (amine and nitrate) hardener

| a | — | 0.1 | 0.2 | 0.3 | 0.4 | 0.5 | 0.6 | 0.7 | 0.8 | 0.9 | 1.0 | 1.3 | 1.6 | 2.0 |
|---|---|-----|-----|-----|-----|-----|-----|-----|-----|-----|-----|-----|-----|-----|
| b | 30.5 | 30 | 29 | 26 | 24 | 21 | 20 | 18 | 17 | 16 | 14 | 12 | 10.3 | 9 | a = amount (pbw) of $Ca(NO_3)_2 \cdot 4H_2O$, 50% in ethanol
b = gel time in minutes The product was transparent, water-white and retained its whiteness over a period of more than 1000 hours, unlike products of the prior art procedure, as in e.g. Comparative Examples A and B, above.

In place of isophoronodiamine, there may be used 55 pbw isophoronediamine and 45 pbw trimethylhexamethylenediamine (consisting of approximately equal parts of the 2,2,4- and 2,4,4-isomers), with similar results. Alternatively also, there may be used $Ca(NO_3)_2 \cdot 2H_2O$, 50% in ethanol, with similar results.

While particular embodiments of the invention have been particularly shown and/or described hereinabove, it will be appreciated that the present invention is not limited to such particular embodiments, since, as will be readily apparent to skilled persons, many variations and modifications can be made. Accordingly, the essential concept, spirit and scope of the present invention will be better understood in the light of the claims which follow.

What is claimed is:

1. A hardener for epoxy resins, to increase resistance in the resins to aging on exposure to ultraviolet radiation, which comprises:
   (a) at least one amine selected from the group consisting of trimethylhexamethylenediamine and isophoronediamine; and
   (b) at least one inorganic nitrate salt selected from the group consisting of ammonium, lithium, sodium, potassium, magnesium, calcium, strontium, barium and aluminum nitrate.

2. A hardener according to claim 1, which contains at least one additional component selected from the group consisting of component (c) and component (d), namely:
   (c) as a solvent for components (a) and (b), at least one solvent medium selected from the group consisting of monohydric alcohols containing 1 to 10 carbon atoms in the molecule, polyhydric alcohols containing 2 to 10 carbon atoms and 2 to 4 hydroxy groups in the molecule, poly-(C2 to C5-alkylene) glycols and phenyl C1 to C4 monohydric alcohols; and
   (d) epoxy resins in less than the stoichiometric ratio required for complete reaction with component (a).

3. A hardener according to claim 2 which further possesses at least one of the following features:
   said hardener further comprises water;
   said solvent medium comprises at least one member selected from the group consisting of ethanol, ethylene glycol, propylene glycol, glycerol and benzyl alcohol;
   said component (b) is present in an amount of 0.05 to 1.0 weight %, based on the weight of component (a).

4. A hardener according to claim 2 free from any phenolic accelerator.

5. A hardener according to claim 2 free from any phenol-derived epoxy resin.

6. A hardener according to claim 1 wherein component (b) is selected from the group consisting of calcium nitrate dihydrate and calcium nitrate tetrahydrate.

7. A hardener according to claim 1 wherein component (a) is isophoronediamine, and the hardener comprises 0.05 to 1.0 weight % based on isophoronediamine, of component (b).

8. A hardener according to claim 7, which contains at least one additional component selected from the group consisting of component (c) and component (d), namely:
   (c) as a solvent for components (a) and (b), at least one solvent medium selected from the group consisting of monohydric alcohols containing 1 to 10 carbon atoms in the molecule, polyhydric alcohols containing 2 to 10 carbon atoms and 2 to 4 hydroxy groups in the molecule, poly-(C2 to C5-alkylene) glycols and phenyl C1 to C4 monohydric alcohols; and
   (d) epoxy resins in less than the stoichiometric ratio required for complete reaction with component (a).

9. A hardener according to claim 8 which further possesses at least one of the following features:
   said hardener further comprises water;
   said solvent medium comprises at least one member selected from the group consisting of ethanol, ethylene glycol, propylene glycol, glycerol and benzyl alcohol;
   said component (b) is present in an amount of 0.05 to 1.0 weight %, based on the weight of component (a).

10. A hardener according to claim 8 free from any phenolic accelerator.

11. A hardener according to claim 8 free from any phenol-derived epoxy resin.

12. A hardener according to claim 9 wherein component (b) is selected from the group consisting of calcium nitrate dihydrate and calcium nitrate tetrahydrate.

13. A method for curing epoxy resins, to obtain a cured product having resistance to aging on exposure to ultraviolet radiation, which comprises the step of employing the hardener defined in claim 1 to cure said epoxy resins.

14. The method for curing epoxy resins defined in claim 13 wherein the epoxy resins to be cured are free from phenol-derived epoxy resins.

15. In a method for curing epoxy resins to obtain a product having resistance to aging on exposure to ultraviolet radiation using a hardener which comprises at least one amine selected from the group consisting of trimethylhexamethylenediamine and isophoronediamine, together with a phenolic accelerator, in the presence of a solvent medium, the improvement which comprises replacing at least 90% of the phenolic accelerator by at least one dissolved inorganic nitrate salt selected from the group consisting of ammonium, lithium, sodium, potassium, magnesium, calcium, strontium, barium and aluminum nitrates, and using at least one solvent medium selected from the group consisting of monohydric alcohols containing 1 to 10 carbon atoms in the molecule, polyhydric alcohols containing 2 to 10 carbon atoms and 2 to 4 hydroxy groups in the molecule, poly-(C2 to C5-alkylene) glycols and phenyl- C1 to C4 monohydric alcohols.

16. In the method for curing epoxy resins defined in claim 15 which is further characterized by at least one of the following features:

said hardener further comprises water;

said solvent medium comprises at least one member selected from the group consisting of ethanol, ethylene glycol, propylene glycol, glycerol and benzyl alcohol;

said inorganic nitrate salt is present in an amount of 0.05 to 1.0 weight %, based on the weight of said amine.

17. In the method for curing epoxy resins defined in claim 15 wherein the hardener is free from any phenolic accelerator.

18. In the method for curing epoxy resins defined in claim 15 wherein the hardener is free from any phenol-derived epoxy resin.

19. In the method for curing epoxy resins defined in claim 15 wherein the inorganic nitrate salt is selected from the group consisting of calcium nitrate dihydrate and calcium nitrate tetrahydrate.

20. In the method for curing epoxy resins defined in claim 15 wherein prior to the incorporation with the amine, the inorganic nitrate salt is dissolved in ethanol as the solvent medium.

21. A product having resistance to aging on exposure to ultraviolet radiation selected from the group consisting of: an article comprising cured epoxy resins; an article including an adhesive comprising cured epoxy resins; a film comprising cured epoxy resins; and a coating comprising cured epoxy resins, in which the resins have been cured by the method defined in claim 13.

22. A product according to claim 21, in which the resins have been cured in situ.

23. A product according to claim 21 which is a shaped article comprising cured epoxy resins.

* * * * *